United States Patent [19]

Schneider

[11] Patent Number: 4,621,821
[45] Date of Patent: Nov. 11, 1986

[54] APPARATUS FOR THE CLAMPING OF ELONGATE WORKPIECES

[75] Inventor: Rudolf Schneider, Reinach, Switzerland

[73] Assignee: Erowa AG, Reinach, Switzerland

[21] Appl. No.: 652,895

[22] Filed: Sep. 21, 1984

[30] Foreign Application Priority Data

Dec. 23, 1983 [DE] Fed. Rep. of Germany ....... 3347403

[51] Int. Cl.$^4$ .............................................. B23B 31/02
[52] U.S. Cl. ...................................... 279/83; 269/277; 269/287; 403/13; 403/362
[58] Field of Search .................... 279/83, 85, 86, 14, 279/87; 269/277, 287; 403/3, 13, 362; 339/263 E, 272 R

[56] References Cited

U.S. PATENT DOCUMENTS

| 92,541 | 7/1869 | Peat | 297/83 |
|---|---|---|---|
| 228,811 | 6/1880 | Goodell | 279/83 |
| 1,163,477 | 12/1915 | Smith | 279/83 |
| 1,330,532 | 2/1920 | Hazelton | 279/83 |
| 1,444,875 | 2/1923 | Hall et al. | 279/83 |
| 2,355,286 | 8/1944 | Fink | 279/83 |
| 3,281,157 | 10/1966 | Hendrickson | 279/83 |

FOREIGN PATENT DOCUMENTS 143340 9/1951 Australia ................................. 279/83

Primary Examiner—Gil Weidenfeld
Assistant Examiner—Daniel W. Howell
Attorney, Agent, or Firm—Yount & Tarolli

[57] ABSTRACT

The invention provides a clamping apparatus, particularly for receiving and clampingly retaining electrode body blanks having prismatic or circular cross section for erosive machining devices. A clamping block has at one of its surfaces an essentially centrally arranged clamping chamber to receive the electrode. Two adjacent walls of the clamping chamber are provided with clamping screws protruding into the clamping chamber. An approximately central position of the workpiece in the clamping chamber is achieved by the provision of distance plates with preselectable thickness, which are inserted into the clamping chamber between two walls thereof and the surface of the workpiece, before the workpiece is clamped by tightening the clamping screws. This clamping apparatus is inexpensive and rugged, so that the electrode, once machined and used, respectively, may always remain clamped and therefore may be used again with a very high precision as far as its position is concerned.

12 Claims, 5 Drawing Figures

APPARATUS FOR THE CLAMPING OF ELONGATE WORKPIECES

BACKGROUND OF THE INVENTION

1. Field of the Invention

The present invention refers to an apparatus for the clamping of workpieces which have a circular or prismatic, i.e. rectangular, square etc. cross section or which include at least one shaft portion having a circular or prismatic cross section. The apparatus according to the invention is particularly suitable for the clamping of electrode blanks for electro-erosive machining devices, but may be useful in clamping every kind of elongate workpieces or of tools having an elongated shaft portion.

The electrodes used in electroerosive machining devices are tools which have to be clampingly fastened to the device with an extraordinarly high precision, not only with regard to their centricity, but also with regard to their angular position relative to their central axis. Such electrodes are manufactured from blanks, e.g. from prismatic, square or round copper bars, by turning and/or milling and/or grinding, whereby the blank has to be clampingly fastened to the chuck of such turning, milling and grinding device during the machining thereof. In the course of the machining of the blank, a precisely located central axis will be defined in the tool, serving as a reference during the subsequent electroerosive machining process.

The blank having been clampingly fastened to the machining device and having been machined to an electrode body, said theoretical central axis is well defined with reference to the clamping apparatus, and it is most desirable not to have to remove the electrode body from the clamping apparatus anymore. Every subsequent clamping of the tool, even if the clamping apparatus is manufactured to an extremely high standard of precision, results in a more or less pronounced shift of said theoretical central axis with reference to the central axis of the clamping apparatus, such effect being most undesired in view of the extremly high precision standards which have to be met during an electroerosive machining process.

2. Prior Art

Suitable coupling devices for the clamping of electrode bodies to electroerosive machining devices are known, which allow a higly precise centrical clamping including the exact provision of a predetermined angular position of the tools on the electroerosive machining device. In many cases, however, it is not possible to fasten the electrode blank directly to a coupling device of such an apparatus, so that a clamping apparatus to be inserted therebetween will be necessary. Besides the required stability and precision, the clamping apparatus must be as inexpensive as possible, since electrodes for electroerosive machining devices have to be stocked sometimes in lots of several hundreds.

It is admitted that clamping devices for prismatic or circular workpieces are known which may comply with the requirements as far as the precision and stability is concerned, which are however relatively expensive. A storage of several hundreds of electrodes each fastened to such a clamping apparatus, therefore, is a very expensive matter.

A clamping apparatus of the kind described above is known from the disclosure of French Pat. No. 514'448. This apparatus comprises a support member of generally cylindrical configuration, one end thereof being connected to a plain flange member equipped with fastening openings, and the body of the support member is equipped with a longitudinal groove having a V-shaped cross section. Further, there is provided an essentially ring-shaped clamping member equipped with a clamping screw. The clamping member may be pushed onto the cylindrical support member in three different positions, depending of the kind and size of the workpiece to be clamped. This apparatus is comparatively complicated and therefore expensive to manufacture, even if only modest requirements with regard to the precision of the clamping have to be met. Due to the elongate design of this apparatus, being anchored at the flange only by means of the quite small front face, the stability and ruggedness of this apparatus is not sufficient at all, if highest requirements of machining precision have to be fulfilled, e.g. in the case of electroerosive machining.

A storage of the electrodes per se, not being fastened to any clamping apparatus, usually is not possible, as the requirements regarding the precision of an exact positioning may not be met in most cases.

OBJECTS OF THE INVENTION

Is is therefore an object of the present invention to provide a clamping device of the kind mentioned above, which not only has the desirable characteristics with regard to the stability and precision of the clamping, but further is very inexpensive to manufacture and thereby constitutes a cheap part, which may be stocked in great amounts without the need of investing an important capital. Thereby the unclamping and the following reclamping of the electrodes is avoided so that a precision is warranted which is able to meet the highest requirements.

Is is a further object of the invention to provide a clamping apparatus of the kind mentioned above which is universally suitable for circular or prismatic workpieces and for workpieces having a circular or prismatic shaft portion, respectively, and which is usable with different sizes of workpieces and shaft portions, respectively, and which finally offers a simple and rapid clamping of the workpiece.

SUMMARY OF THE INVENTION

In order to meet these and other objects, the invention provides a novel apparatus for the clamping of elongate workpieces which avoids all the disadvantages mentioned hereinbefore. Basically, the apparatus according to the invention comprises a clamping body in the shape of a block member, which has a first surface which is exactly plainly machined, and a second surface opposite to said first surface and extending essentially parallel to said first surface. The block member comprises a clamping chamber in the form of a central recess machined into the second surface, the cross section of said clamping chamber, seen in a plane parallel to said first and second surfaces, is of essentially square configuration. Thereby the clamping chamber has a first, a second, a third and a fourth side wall. Two adjacent side walls are arranged rectangularly relative to each other. The clamping body further comprises at least one clamping screw protruding into the clamping chamber and being received in a threaded through hole provided in the clamping block member. The clamping screw is adapted to clampingly engage the surface of a workpiece inserted into the clamping chamber.

Further, there is provided a set of insert means including a plurality of plate-like body members with different thickness adapted to be selectively inserted into said clamping chamber and placed between the surface of said workpiece to be clamped and at least one of said side walls of said clamping chamber.

The set of plate-like insert body members preferably may comprise at least a first plurality of insert plates, the thickness thereof differing by 0.5 and 1 mm, respectively, but even more preferably also a second plurality of insert plates having a thickness in the region of 1/100 to 1/10 mm.

A reliable and comfortable clamping of a workpiece in the clamping chamber may be achieved, if the length of the insert plates corresponds to the depth of the clamping chamber provided in the clamping block member, and if the width of the insert plates is greater than half of the width of the walls of the clamping chamber.

When it is desired to design the apparatus for the clamping of elongate workpieces with rectangular or square cross section or of workpieces having a shaft portion with rectangular or square cross section, it may be constructed such that the clamping body comprises a first and a second clamping screw protruding into the clamping chamber, said first clamping screw being received in a first threaded through hole provided in the first side wall of the clamping chamber and said second clamping screw being received in a second threaded through hole provided in the second side wall of the clamping chamber, said first and second clamping screws being adapted to clampingly engage two adjacent surfaces of said workpiece and of said shaft portion, respectively, inserted into the clamping chamber. In this case, the set of insert means includes a plurality of plate-like body members with different thickness adapted to be selectively inserted into said clamping chamber and placed between the two surfaces opposite to said two adjacent surfaces of said workpiece and said shaft portion, respectively, to be clamped and said third and fourth side walls of said clamping chamber.

If it is, however, desired to design the apparatus for the clamping of elongate workpieces with circular cross section or of workpieces having a shaft portion with circular cross section, it may be constructed such that the clamping body comprises a clamping screw protruding into the clamping chamber and being received in a threaded through hole provided in the corner enclosed by said first side wall of the clamping chamber and said second side wall of the clamping chamber, said clamping screw being adapted to clampingly engage the surface of said workpiece and of said shaft portion, respectively, inserted into the clamping chamber. In this case, the set of insert means includes a plurality of plate members with different thickness to be selectively inserted into the clamping chamber and placed between the surface of said workpiece and said shaft portion, respectively, to be clamped, and said third and fourth side walls of the clamping chamber.

Preferably, the corners of the clamping chamber are provided with cylindrically shaped recesses. Thereby it may be ensured that the plate-like insert members reliably abut against the inner surface of the walls of the clamping chamber without being disturbed by possibly inaccurately machined acute corner portions.

If it is desired to clamp either workpieces with circular cross section or square or rectangular cross section, there may be provided three clamping screws, one thereof being arranged in the corner enclosed by two adjacent walls receiving the other two clamping screws, said one clamping screw provided in said corner extending substantially diagonally to the clamping chamber and protruding thereinto, while said other two clamping screws extend substantially parallel to the walls of the clamping chamber and protruding thereinto.

The plainly machined surface of the clamping block preferably may comprise suitable means to secure the clamping block to a clutch device, to a machining device etc.

The set of plate-like insert bodies may comprise a plurality of insert plates, the thickness thereof differing by 0.5 and 1 mm, respectively, as well as a further plurality of insert plates having a thickness in the region of 1/100 to 1/10 mm, Thereby a very precise centering of the workpiece may be achieved, if desired, even if such precise centering will not be necessary in the normal case of application of the clamping apparatus.

Preferably, the length of said insert plates corresponds to the depth of the clamping chamber provided in the clamping block, and the width of the insert plates is greater than half of the width of the walls of the clamping chamber, thereby assuring a reliable fit of the insert plates in the chamber and warranting that the center of a wall thereof always is covered by one or more insert plates to provide a well defined abutting surface for the workpieces to be clamped in the apparatus.

BRIEF DESCRIPTION OF THE DRAWINGS

In the following there will be described a preferred embodiment of the apparatus according to the invention, with reference to the accompanying drawings, in which.

DESCRIPTION OF A PREFERRED EMBODIMENT

Figure 1:
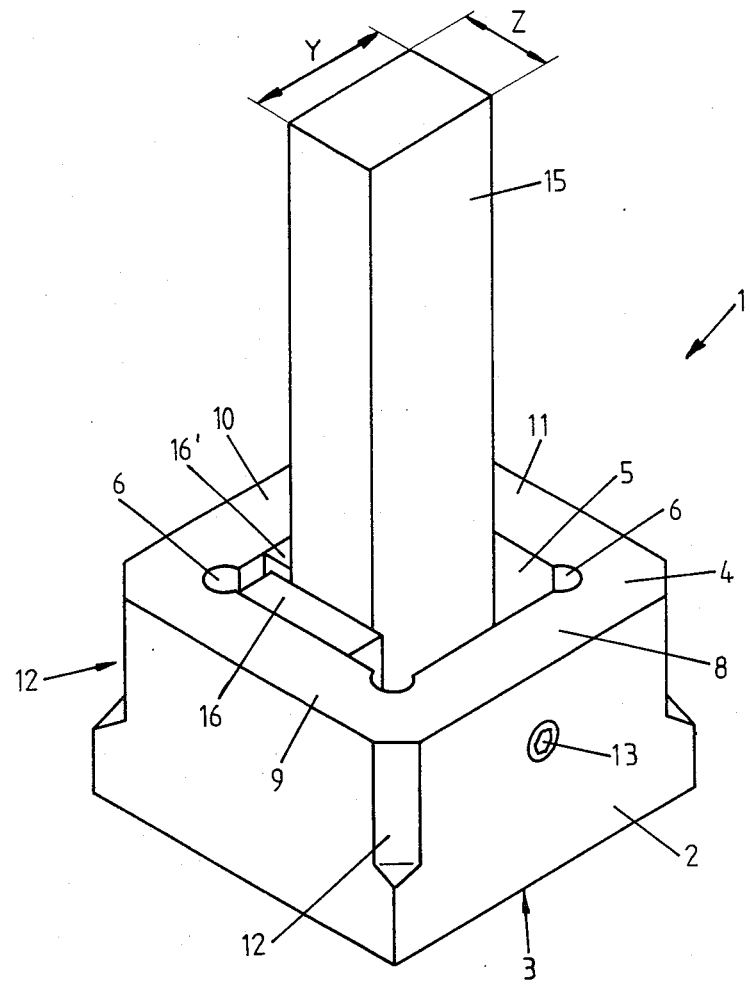
FIG. 1 shows a perspective view of a clamping apparatus with a clampingly fastened workpiece blank having rectangular cross section.

The clamping apparatus generally designated with 1 includes a clamping block 2, which has an essentially cubical shape and which is preferably manufactured of steel. It is understood that the outer shape of the clamping block might be different, e.g. cylindrical or rectangular instead of square as shown in the drawings. The lower surface 3 in FIG. 1 is exactly machined to be plain and includes means to be fastened to a coupling device, to a machining device etc.; such means will be further explained in more detail. In the surface 4 of the clamping block, i.e. which is opposite to the lower, plainly machined surface 3, there is provided a clamping chamber 5 recessed with reference to this surface 4, said clamping chamber having essentially square cross section, whereby the corners are provided with rounded recesses 6. The depth of the chamber 5 is somewhat less than the height of the clamping block 2, so that the chamber 5 is provided with a bottom wall part 7 integrally formed with the clamping block 2.

Thereby the clamping chamber 5 is delimited by four walls 8, 9, 10 and 11, which, together with the bottom part 7, form the real clamping chamber. In the present example, as already mentioned, the outer contour of the clamping block 2 has square cross section, but with the same result a rectangular or circular cross section may be chosen. The cross section of the clamping chamber, however, preferably should be always of square configuration. In the present example, the side edges of the clamping block 2 are provided with serrations 12 which extend along a part of the height thereof, facing the upper surface 4.

Two adjacently arranged walls of the clamping block 2, in the present embodiment the walls 8 and 11, each are provided with a clamping screw 13 and 14, respectively, which are received in a threaded through hole provided in the respective walls. These clamping screws serve to clampingly fasten a workpiece, which has, according to the embodiment shown in FIG. 1, the shape of a elongated rod 15 with rectangular cross section, or, according to the embodiment shown in FIG. 3, the shape of an elongated rod 15' with circular cross section. This workpiece may be a copper rod which is used as a blank in manufacturing erosion electrodes for electroerosive machining devices. The cross section of the rod 15 and 15', respectively, is in all dimensions less than the cross section of the clamping chamber 5.

As can be seen from FIG. 1, there is provided a pair of insert plates 16 and 16' in order to enable the rod 15 to be clamped at least nearly centrally within the clamping chamber 5. The design of the insert plates will have to be described in the following in more detail. The essential point is that the rod 15, after tightening the clamping screws 13 and 14, will be pressed against the plates 16 and 16' and thereby against the inner surface of the opposite wall 9 and 10, respectively. The requirements with regard to plainness and angular orientation, which the inner surfaces of the walls 8 to 11 have to comply with, are not very stringent; but it is important only that the workpiece, e.g. the rod 15, is immovably and more or less centrically clamped in the clamping chamber 5. It is understood that the same applies to the embodiment according to FIG. 3; the circular rod 15' will be clamped against the insert plates 16 and 16' by means of the single clamping screw 17. The clamping screws 17 and 14 may also be provided in this embodiment, but are not used to clamp a circular workpiece. Therefore they are not shown in FIG. 3.

Figure 4:
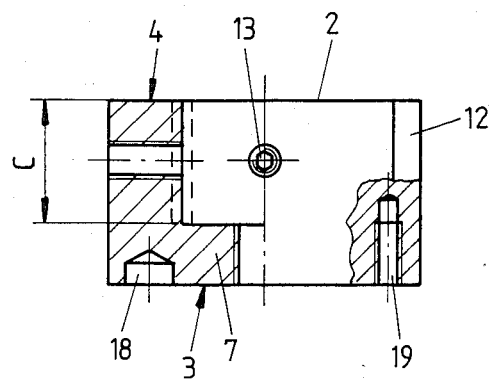
FIG. 4 shows a partially cut side view of an empty clamping apparatus.
Figure 5:
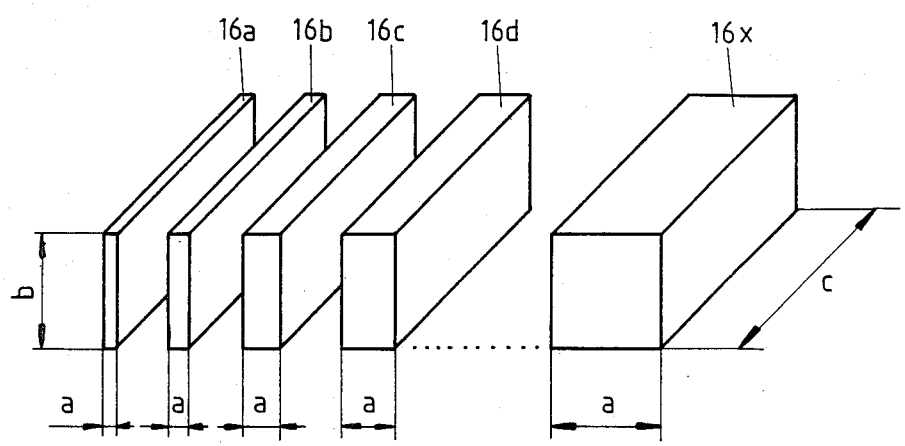
FIG. 5 shows a perspective view of a few different insert plates included in the set of insert plates.

As can be seen from FIG. 5, the clamping apparatus includes a set comprising a plurality of insert plates 16a . . . 16x, the height c thereof corresponding approximately to the depth C (FIG. 4) of the clamping chamber 5. The width b of the plates 16a . . . 16x is dimensioned such that each plate 16a . . . 16x, independently of its position in the clamping chamber 5, always reaches and covers the center of the related side walls 8 to 11, against which it will rest in order to reliably support a workpiece having either prismatic or circular cross section.

The thickness of the individual plates is different; the graduation in the thickness of the individual plates 16 may be 0.5 or 1 mm. In the present example, the thickness of the plate 16a is 0.5 mm, the one of the plate 16b is 1 mm, the one of the plate 16c is 2 mm and the one of the following plates 16d to 16x is 1 mm more for each individual plate. Preferably this set of insert plates always includes a plurality of plates 16 with the same thickness, but at least two plates 16a . . . 16x with the same thickness. The plate 16x may have a thickness which is somewhat less than half the distance between two opposite walls 8 and 10 or 9 and 11, respectively, thereby providing the possibility to clamp also workpieces with a very small size. Of course, another possibility is to combine a plurality of stacked plates on each side in order to reach the required total thickness.

Figure 2:
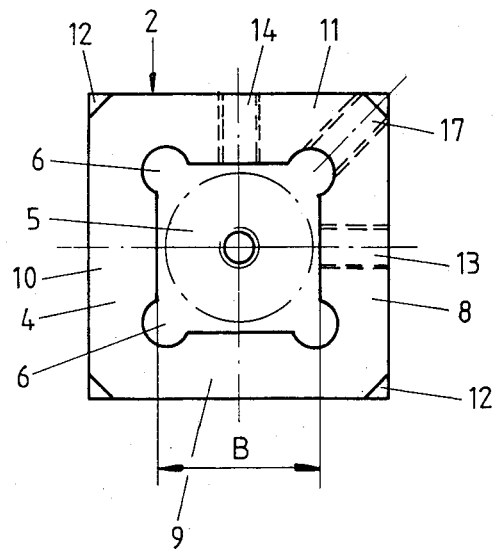
FIG. 2 shows a top view of the empty clamping apparatus, i.e. the surface incorporating the clamping chamber.

In order to clamp a workpiece 15 having a rectangular cross section, as it is shown in FIG. 1, one has to proceed as follows: The clear width B (FIG. 2) between opposite walls 8 and 10 or 9 and 11 of the chamber 5 is known; the two cross sectional dimensions y and z of the workpiece 15 may be measured. As the plate 16 (FIG. 1), a suitable plate is selected out of the set, the thickness thereof corresponding to half of the difference between the value B and the value y. Correspondingly, as the plate 16', a suitable plate is selected out of the set, the thickness thereof corresponding to half of the difference between the value B and the value z. Therereby the center of the rod 15 is, at least approximately, in the center of the clamping chamber 5 and consequently in the center of the clamping apparatus 2.

EXAMPLE

The width of the clamping chamber, i.e. the distance between walls 8 and 10 as well as the distance between walls 9 and 11 is: B=26 mm.

The width of the rectangular rod 15 is: y=20 mm.

The thickness of the rectangular rod 15 is: z=8 mm.

The required thickness of the plates 16 and 16' is calculated as follows:

Plate 16:

$$(B-y)/2 = (26 \text{ mm} - 20 \text{ mm})/2 = 3 \text{ mm}$$

Plate 16':

$$(B-z)/2 = (26 \text{ mm} - 8 \text{ mm})/2 = 9 \text{ mm}$$

Consequently, a first plate with a thickness of 3 mm and a second plate with a thickness of 9 mm is selected from the set of plates and inserted into the clamping chamber 5 to centrically clamp the workpiece 15.

If the centricity of clamping of the workpiece has to meet very high requirements and if the size of the workpiece has odd values, additional insert plates may be provided, the thickness thereof being in the region of 1/100 mm to 1/10 mm, and which may be inserted into the clamping chamber 5 additionally to the plates 16a . . . 16x with coarser graduation. Usually, however, it is not of very great importance whether the workpiece is clamped very exactly in the center of the clamping apparatus or not, since the machining of the blank is performed only subsequently, whereby the exact theoretical central axis will be constituted.

It is understood that the same is true in the case of a workpiece 15' with circular cross section. The calculation of the thickness of the plates 16 and 16' (FIG. 3), which of course will be the same, is very similar:

The thickness of the required plates corresponds to half of the difference between the width B of the clamping chamber and the diameter of the workpiece 15'.

The only important point is that the workpiece 15 and 15', respectively, once having been clamped, is immovably and reliably retained in the clamped apparatus 2, on the one hand during the machining of the workpiece 15 and 15', respectively, on the other hand during the storage thereof. These requirements are certainly fulfilled by the rugged, simple design of the clamping block 2.

Figure 3:
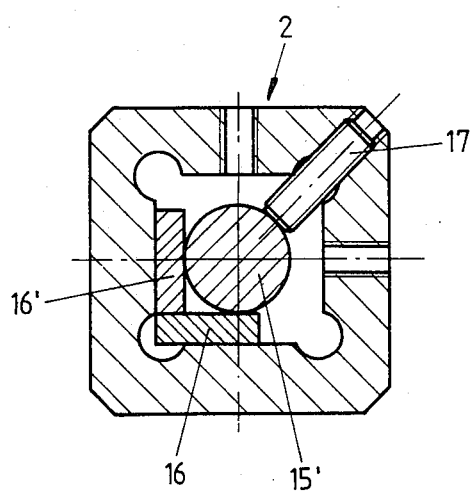
FIG. 3 shows a cross sectional view of the clamping apparatus with a clamped workpiece having circular crosssection.

It can be seen from FIG. 3 how a round workpiece 15a is clamped in the clamping apparatus. To this purpose an additional clamping screw 17 is provided, which is arranged in the region of a corner of the clamping chamber 5, preferably in that corner which is enclosed by the walls 8 and 11 which are equipped with the clamping screws 13 and 14. In the remaining respects, the design and the proceeding during the clamping process is exactly corresponding, whereby logically two plates 16 and 16' with identical thickness have to be used. The serrations 12 as mentioned above favour the provision of the additional clamping screw 17 which extends essentially diagonally to the cross section of the clamping chamber 5.

The view according to FIG. 4 shows that the lower surface 3 of the clamping block 2 is equipped with recesses 18 and threaded holes 19. These recesses and holes serve to receive (not shown) means for fastening and centering the clamping block 2 to and with regard to, respectively, a machining device.

With the clamping apparatus according to the invention there is provided a simple, precise and rugged means to rapidly and reliably clamp elongate workpieces with prismatic or circular cross section, particularly erosion electrodes and the blanks for manufacturing them, respectively. Usually the size of the clamping chamber 5 may be selected such that nearly all sizes of electrodes may be received therein; the manufacture and the storage of such clamping apparatus' is, of course, thereby much more inexpensive, as only a single type of clamping block 2 is required for clamping differently sized electrodes. The insert plates are simple components which may be precisely manufactured at low costs and which consequently may be kept ready in a great number and in a great variety.

Only one single surface, namely the surface 3, of the clamping block has to be machined with great precision, i.e. it has to be grinded to accurate plainness, as the connection of the clamping apparatus 1 will be effected only by means of this surface and the fastening means provided thereon, respectively. The finally machined electrode will always remain clamped in the clamping apparatus 1, even if it is put into the stock. This is possible without involving a great capital expenditure as the clamping apparatus is an inexpensive component, whereby the required high precision of the position of the electrode is warranted by avoiding the necessity of removing the electrode and re-clamping it, as it has been done before.

Thanks to the closed design of the clamping block 2, which is preferably manufactured of machining steel, a high stiffness of the clamping apparatus results, so that the workpieces are reliably and immovably anchored by tightening the clamping screws 13 and 14, and 17, respectively.

What I claim is:

1. An apparatus for clamping an elongated workpiece comprising:
    a clamping body having a first support surface for supporting said clamping body relative to a machining device and side wall surfaces extending transverse of said first support surface and defining at least in part a chamber for receiving the elongated workpiece therein, said chamber having a substantially square cross-section, said clamping body having a second support surface extending substantially parallel to said first support surface in spaced relationship thereto for supporting the elongated workpiece in said chamber and forming the bottom of said chamber;
    said clamping body having at least one threaded hole extending transverse to said side wall surfaces;
    at least one threaded clamping screw received in said one threaded hole for securing the elongated workpiece in said chamber; and
    a plurality of plate-like inserts adapted to be selectively inserted between a surface of the elongated workpiece and a portion of said side wall surfaces forming one side of said square chamber in said clamping body to vary the size of said chamber to thereby provide for securing in said chamber elongated workpieces of different dimensions and in a central position relative to said chamber.

2. An apparatus according to claim 1 wherein the corners of said chamber are provided with cylindrically shaped recesses.

3. An apparatus according to claim 1 wherein said first support surface comprises means for securing said clamping body relative to the machining device.

4. An apparatus according to claim 1 wherein said plurality of inserts comprises inserts having a thickness in mm which is an integer multiple of 0.5.

5. An apparatus according to claim 1 wherein said plurality of inserts comprises inserts having a thickness in mm which is an integer multiple of 1.

6. An apparatus according to claim 1 wherein said plurality of inserts comprises a first set of inserts having a thickness in mm which is an integer multiple of a first number and at least one second set of inserts having a thickness in mm which is an integer multiple of at least one second number different from said first number.

7. An apparatus according to claim 6 wherein said first number equals 0.5 and said second number equals 0.1.

8. An apparatus according to claim 7 wherein said plurality of inserts further comprises a third set of inserts having a thickness in mm which is an integer multiple of a third number equal 0.01.

9. An apparatus according to claim 4, 5, 6, 7 or 8 wherein the length of each insert equals substantially to the length of said portion, and the width of each of said inserts is greater than the width of said portion.

10. An apparatus according to claim 1 wherein said clamping body has two threaded holes extending transversely to said side wall surfaces and arranged at an angle of 90° to each other for receiving two clamping threaded screws for securing the elongated workpiece in said chamber.

11. An apparatus according to claim 10 wherein said clamping body has a third threaded hole extending transversely to said side wall surfaces and through a corner of said chamber between said two threaded holes.

12. An apparatus according to claim 1 wherein said inserts are adapted to be selectively inserted between a surface of the elongated workpiece and two adjacent portions of said side wall surfaces forming two adjacent sides of said square chamber.

* * * * *